United States Patent
Rodriguez et al.

(10) Patent No.: US 7,489,254 B2
(45) Date of Patent: Feb. 10, 2009

(54) SYSTEM AND METHOD FOR MONITORING A VERTICAL SHAFT IMPACT CRUSHER

(76) Inventors: Damian Rodriguez, 263 S. Vasco Rd., Livermore, CA (US) 94551; Michael Summers, 263 S. Vasco Rd., Livermore, CA (US) 94551

( * ) Notice: Subject to any disclaimer, the term of this patent is extended or adjusted under 35 U.S.C. 154(b) by 268 days.

(21) Appl. No.: 11/399,863

(22) Filed: Apr. 7, 2006

(65) Prior Publication Data

US 2007/0241920 A1  Oct. 18, 2007

Related U.S. Application Data

(60) Provisional application No. 60/669,944, filed on Apr. 7, 2005.

(51) Int. Cl.
G08B 21/00 (2006.01)
(52) U.S. Cl. ............... 340/679; 340/691.1; 340/825.67
(58) Field of Classification Search ........... 340/679, 340/680, 682–683, 686.1, 686.3, 686.5, 691.1, 340/691.6, 691.7, 825.16, 825.33, 825.36, 340/825.65, 825.67; 310/90
See application file for complete search history.

(56) References Cited

U.S. PATENT DOCUMENTS

| | | | | |
|---|---|---|---|---|
| 4,340,886 A * | 7/1982 | Boldt et al. | ................. | 340/682 |
| 4,597,535 A | 7/1986 | Fontanille | | |
| 4,679,659 A * | 7/1987 | Jendick | .................... | 184/15.2 |
| 4,793,560 A | 12/1988 | Schrödl | | |
| 5,323,974 A * | 6/1994 | Watajima | .................... | 241/275 |
| 5,616,031 A * | 4/1997 | Logg | ........................... | 434/38 |
| 5,864,070 A | 1/1999 | Kira | | |
| 6,297,573 B1 * | 10/2001 | Roth-Stielow et al. | ..... | 310/68 C |
| 6,332,582 B1 | 12/2001 | Ikegami et al. | | |
| 6,474,577 B2 | 11/2002 | Ikegami et al. | | |
| 6,523,765 B1 | 2/2003 | Kurenuma et al. | | |
| 6,527,054 B1 * | 3/2003 | Fincher et al. | ............. | 166/357 |
| 6,732,458 B2 | 5/2004 | Kurenuma et al. | | |
| 6,874,364 B1 | 4/2005 | Campbell et al. | | |
| 7,113,871 B2 * | 9/2006 | Renner | ....................... | 702/35 |
| 7,350,725 B2 * | 4/2008 | Dallimore et al. | ............. | 241/5 |
| 2003/0178515 A1 * | 9/2003 | Boerhout et al. | ............. | 241/30 |
| 2004/0155128 A1 | 8/2004 | Ikegami et al. | | |
| 2006/0022074 A1 | 2/2006 | Garvin et al. | | |

OTHER PUBLICATIONS

Metso Minerals, "Nordberg Barmac VSI Crusher, Operational Control System (VOCS)" Product Presentation Catalog, Sep. 1999, p. 7.

* cited by examiner

*Primary Examiner*—Daniel Previl
(74) *Attorney, Agent, or Firm*—Brian Beverly; Beeson Skinner Beverly, LLP

(57) ABSTRACT

A system and method for monitoring a vertical shaft impact crusher comprises a plurality of sensors which continuously monitor the current status of a plurality of crusher component parts, a computer in communication with the sensors, and a graphical user interface in communication with the computer and on which is displayed a plurality of virtual instruments. The computer interprets the signals received from the sensors and renders a perceptible indication of a plurality of crusher conditions on the plurality of virtual instruments, each of which conditions are associated with or derived from one or more of the signals received from the sensors. In a preferred embodiment, a recorded history of the status of each of the conditions may be viewed on a historical data viewer for a selected time period.

16 Claims, 9 Drawing Sheets

SYSTEM AND METHOD FOR MONITORING A VERTICAL SHAFT IMPACT CRUSHER

CROSS REFERENCE TO RELATED APPLICATIONS

This application claims the benefit of U.S. Provisional Application No. 60/669,944, filed Apr. 7, 2005.

BACKGROUND OF THE INVENTION

1. Field of the Invention

The present invention relates to rock crushing machines and, more particularly, to a system for monitoring, recording, and evaluating a plurality of conditions on a vertical shaft impact crusher.

2. Description of the Prior Art

Vertical shaft impact (VSI) rock crushers provide the rock crushing industry with an efficient and remarkably effective tool for breaking rocks down to a functional particle size. VSI crushers work on the principle that mineral material fed axially into a spinning rotor is flung outwardly at high speed into a chamber surrounding the rotor. Material first ejected from the rotor is retained in the chamber and acts as a rock lining which protects the walls and other parts of the chamber. Thus the breakdown of the rock is caused in great part by the forces of the rocks subsequently ejected from the rotor impacting the rock lining of the chamber rather than other parts of the machine. VSI crushers are described in U.S. Pat. No. 3,970,257 to MacDonald, et al. and U.S. Pat. No. 4,940,188 to Rodriguez.

While one of the great advantages of VSI crushers is the employment of rock-on-rock impact as the disintegrating force, the forces bearing on these machines remain extreme and highly variable. The rotor is a substantial structure rotating at high speed mounted on a bearing cartridge assembly having top and bottom radial bearings. The top and bottom radial bearings are enclosed in a bearing cartridge assembly which includes the main shaft which rotates with and supports the rotor. Smooth operation of the bearing cartridge assembly and rotor depends on the continued health of each of the radial bearings within the cartridge assembly.

The rotor is impelled by a motor typically having three phases, each of which separately draws current, rotating the motor shaft. The continuous operation of the motor requires that each phase operate under an upper temperature limit, and that each motor bearing continues to function smoothly. If excess load is placed on the motor, the amperage draw of the motor will increase, causing a rise in winding temperatures and undesirable stress on the motor.

The continued smooth rotation of the rotor requires that the machine be constantly lubricated. Many VSI crushers are equipped with automated lubrication mechanisms. However, if the lubrication mechanism should fail, or be otherwise neglected, e.g. by failing to refill the lubricant reservoir, the crusher will not be properly lubricated.

Access to the crusher chamber is generally provided through an opening protected by a lid or closed door. An open crusher lid during operation creates a dangerous condition. Similarly, the typical VSI crusher operates using a plurality of V-belts, access to which is provided through an opening covered by a V-belt guard. If the guard is left open during operation of the crusher, the operator can be exposed to a dangerous condition.

The proper reduction of certain minerals requires that the aggregate be fed into the machine at high temperatures. Operation of the crusher when the rotor and crusher chamber are exposed to high feed temperature may adversely affect the operation of the machine.

Understandably, VSI crushers experience regular breakdowns which are frustrating, expensive and time consuming. Generally, the cause of the breakdown of a crusher is determined by a physical inspection of the problem after the breakdown has occurred. In far too many cases, the crusher is only returned to operation after a part is repaired or replaced resulting in an expensive production loss period of downtime. Heretofore, there has been no effective predictive method to monitor the various conditions of an operating VSI crusher so that preventative action can be taken.

SUMMARY OF THE INVENTION

A monitoring system for the VSI crusher, according to the invention, comprises a plurality of sensors physically mounted to a plurality of components of a VSI crusher in strategic locations to enable measurement of a plurality of conditions experienced by the crusher mechanism. The sensors are connected to an input-output device to convert analog signals received from the sensors to digital format for transmission over an Ethernet cable to an associated computer. The sensors measure the temperature of the motor at five different locations, the amperage draw of the motor, the speed of rotation of the rotor, the degree of vibration of the crusher mechanism, the number of completed lube cycles, the temperatures of the upper and lower bearings, the temperature of the crusher chamber, the status of the crusher chamber lid as being open or closed, and the status of the V-belt guard as being open or closed.

Software instructions executed by the computer read the data received from each sensor and perform calculations on it to display information on virtual instruments on the computer's display reflecting various conditions experienced by the crusher. Some of the information reflects conditions measured by individual sensors, while other information is derived from data measured by one or more sensors. For example, the rundown time of the rotor is derived from a first sensor, which measures when the power to the motor is terminated, and a second sensor, which determines that the rotor has nearly come to a stop. A number of conditions will trigger an alarm if that condition exceeds an established high alarm limit. These conditions generally indicate a high temperature or vibration level. If a condition continues in the high alarm state for more than a maximum time limit, the system will execute an instruction to shut the crusher off. Information for each of the virtual instruments is saved in the system's memory to create a historical record of that condition.

The system therefore enables both real-time monitoring of crusher conditions and forensic diagnosis of problems experienced by the crusher over a selected time period.

Operation of the system using a computer also enables remote monitoring of the conditions of any given VSI crusher from any location in the world by establishing communication between a local computer to which the crusher sensors are connected, and a remote computer, acting as a remote monitoring station, through a computer network such as the internet. This has the added advantage of enabling an authorized user at the remote location to monitor the operation of the crusher through the system.

A monitoring system for a VSI crusher, according to the invention, therefore, provides tools for monitoring and forensic diagnosis of crusher conditions with a thoroughness and accuracy not heretofore available.

BRIEF DESCRIPTION OF THE ILLUSTRATIONS

DETAILED DESCRIPTION OF THE ILLUSTRATED EMBODIMENT

Figure 1:
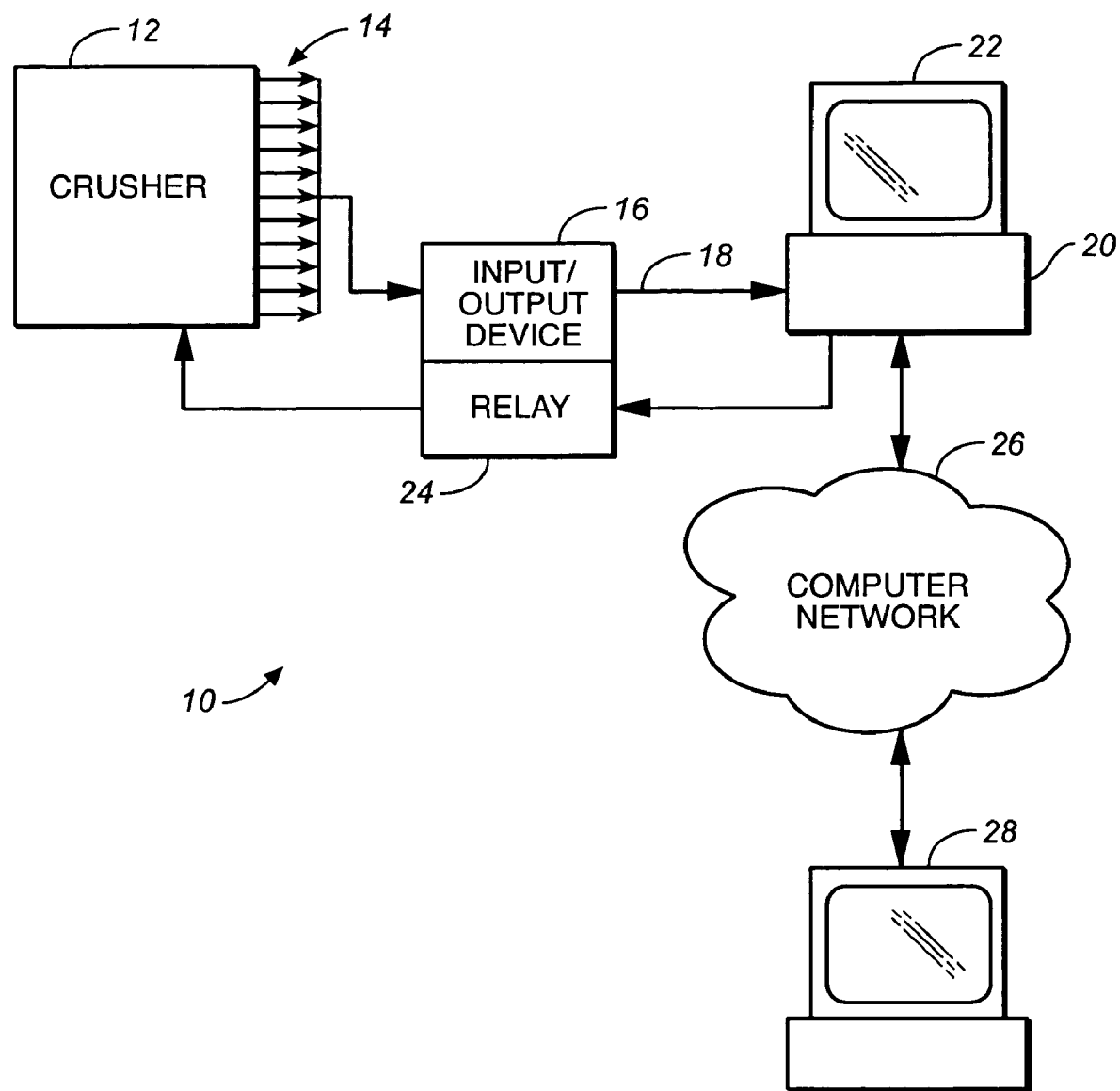
FIG. 1 is a graphic representation of a monitoring system for a VSI crusher according to the invention.
Figure 2A:
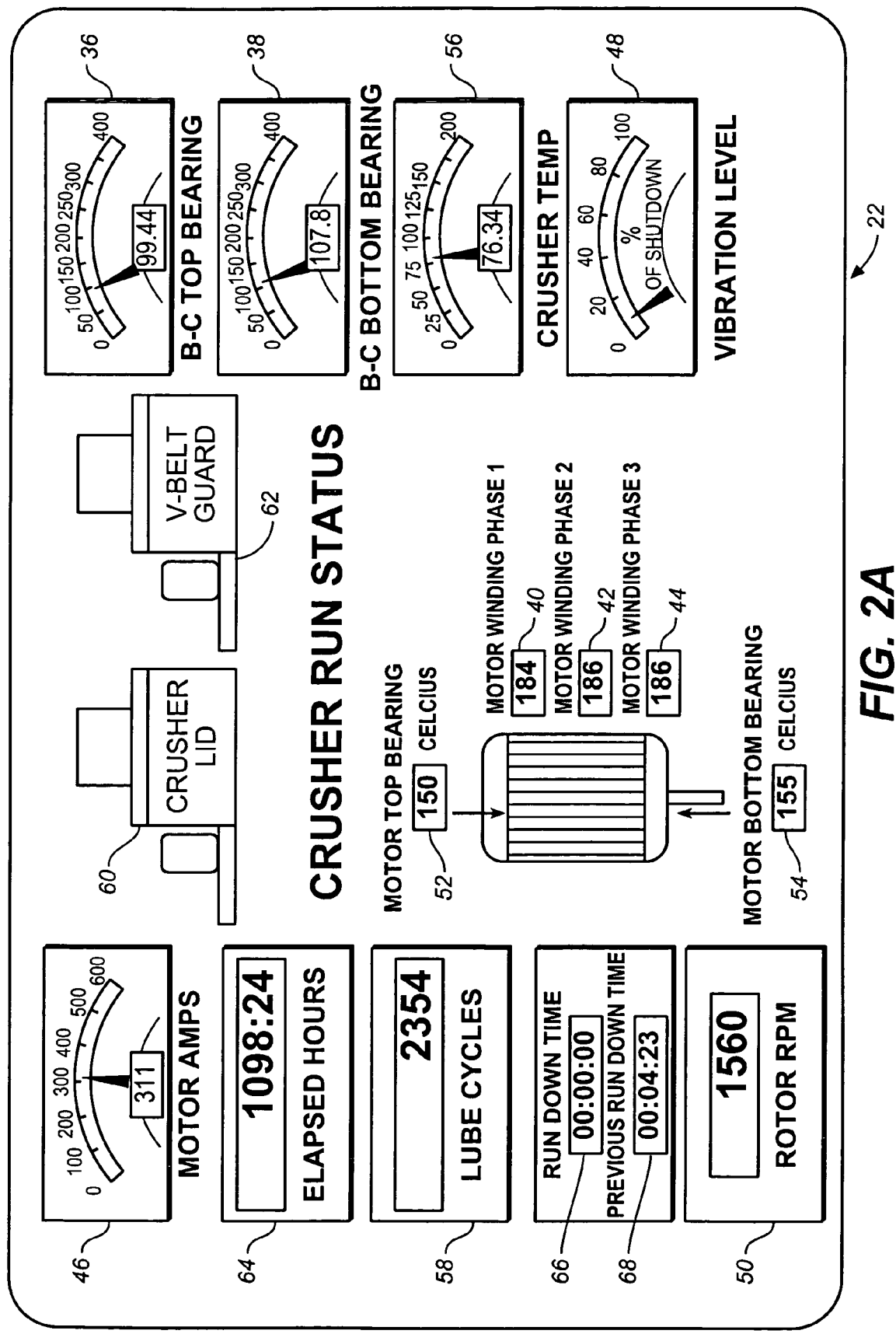
FIG. 2 is a graphic representation of the display of the monitoring system of FIG. 1.
Figure 2B:
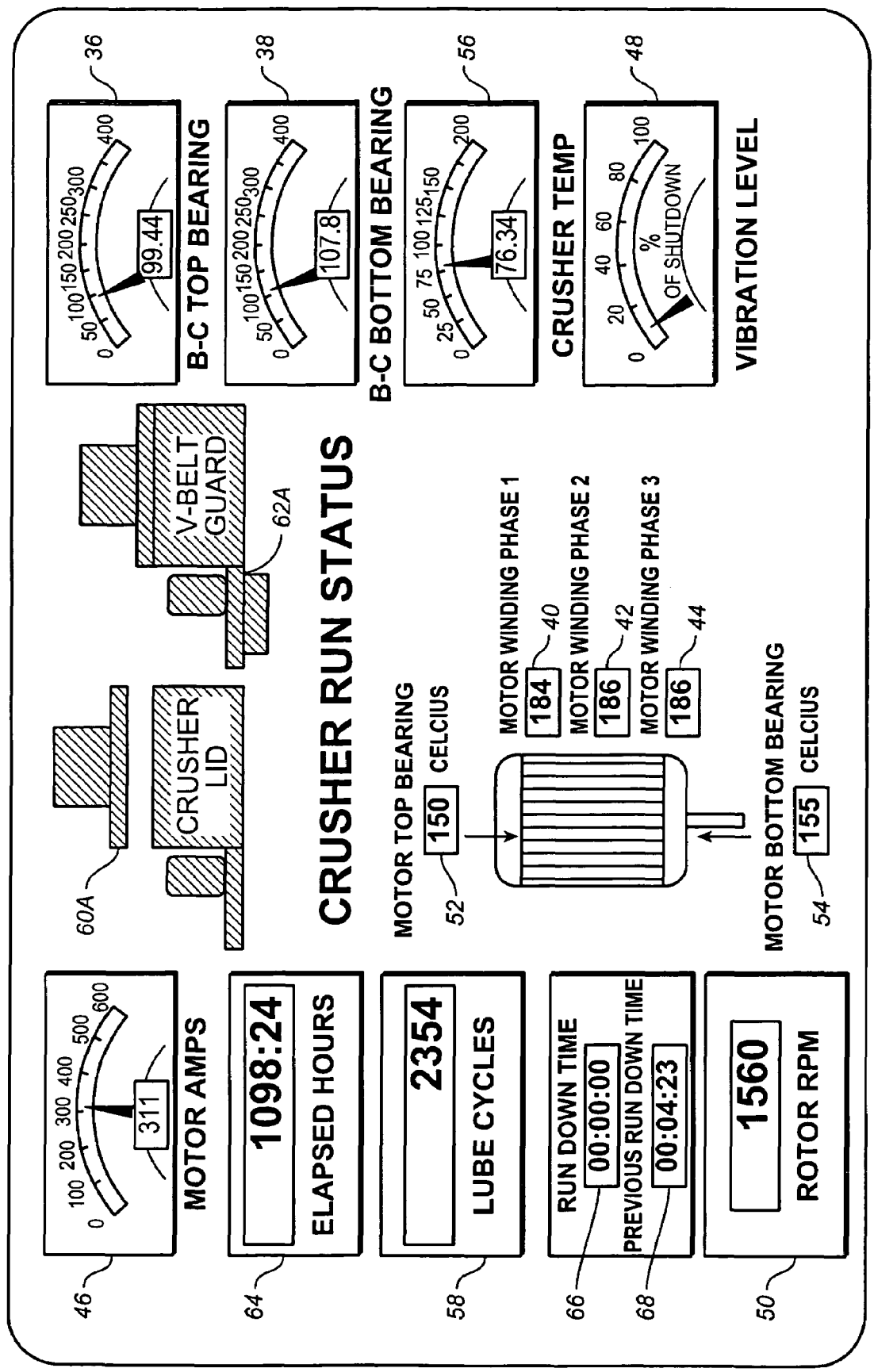

With reference initially to FIG. 1 of the accompanying illustrations, a monitoring system, indicated generally at 10, for a Vertical Shaft Impact (VSI) crusher 12 comprises a plurality of sensors 14 attached to the crusher to monitor a plurality of physical components of the machine. The sensors are electrically connected to an input/output device 16 that converts signals from the sensors into digital format for transfer over an Ethernet cable 18 to a computer 20. Software instructions executed by the computer interpret the data to display information regarding the crusher on a plurality of virtual instruments on a graphical user interface 22 in communication with the computer 20. See also FIG. 2.

A three phase motor is typically used for driving the rotor of a VSI crusher, the shaft of which is supported on and rotates between dual bearings, typically a top bearing and a bottom bearing. The system sensors preferably measure all five aspects of the motor: the top motor bearing and the bottom motor bearing temperatures and the temperature of each of the three phases. In addition, a motor amperage sensor monitors the amperage draw of the motor.

The extreme forces created by impacts within the machine are a major stressor. Therefore, a crusher vibration sensor measures the vibration of the crusher in general. While the vibration sensor could be mounted anywhere on the crusher from which useful vibration measurements could be obtained, preferably, the sensor is mounted in the horizontal plane of the rotor.

The rotor must withstand constant severe forces resulting from rocks fed into it and ejected from its discharge ports. It also must endure very substantial centrifugal forces resulting from high rotational speeds. The system therefore provides a bottom radial bearing sensor to measure the temperature of the bottom radial bearing of the bearing cartridge assembly, and a top radial bearing sensor to measure the temperature of the top radial bearing of the bearing cartridge assembly. A rotor RPM sensor is provided to measure the revolutions per minute (RPM) of the rotor by measuring the RPMs of the main shaft with the rotor affixed to it.

The robust mechanism of a VSI crusher is dependent for its health on constant lubrication, failing which a breakdown will certainly follow. A lubrication cycle sensor is therefore provided to record the number of lube cycles carried out by the lubrication mechanism. This is generally accomplished by counting the cycles of a reciprocating part in an automated lubrication mechanism.

In the preferred embodiment, the system also provides a crusher temperature sensor to measure the temperature of the interior of the crushing chamber, a crusher lid sensor to monitor whether the lid to the crusher chamber is open or closed, and, finally, a V-belt guard sensor to monitor whether the guard providing access to the V-belts is open or closed.

Each sensor is preferably wired directly into an input/output device, which collects the analog signal from the sensors and converts it to a digital format suitable for transmission across an Ethernet cable to a computer.

Figure 4:
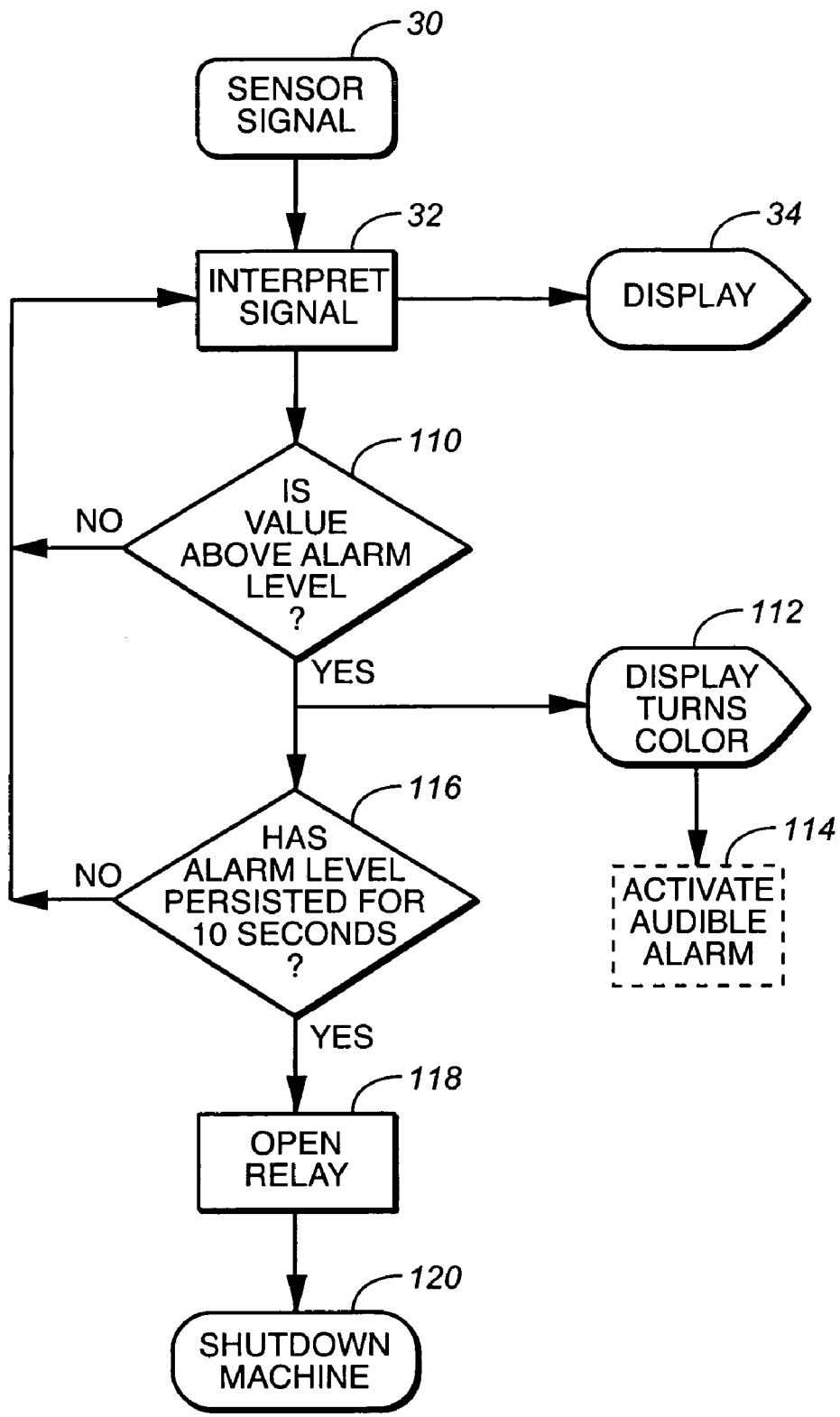
FIG. 4 is a schematic diagram showing the process for interpreting the signals from the system sensors and for the alarm and shutdown processes according to the invention.

With reference to FIG. 4, the sensor signal 30 from each sensor is interpreted, at 32, to display information on a virtual instrument, at 34 reflecting the status or condition being measured by that sensor. Thus, referring additionally to FIG. 2A, the information derived from the top motor bearing sensor is used to indicate the top motor bearing temperature in the motor top bearing virtual instrument 52. The information derived from the bottom motor bearing sensor is used to display the bottom motor bearing temperature in the bottom motor bearing virtual instrument 54. The information derived from the sensors on the windings of Phases 1, 2 and 3 of the motor are used to display the temperatures of Phases 1, 2 and 3, respectively, of the motor on the motor winding phase virtual instruments 40, 42, 44. The information derived from the motor amps sensor is used to indicate the amperage draw on the motor amps virtual instrument 46. The information derived from the crusher vibration sensor is used to indicate the vibration level of the crusher on the vibration level virtual instrument 48. The information derived from the rotor RPM is used to display the speed of rotation of the rotor in revolutions per minute on the rotor RPM virtual instrument 50. The information derived from the top and bottom radial bearing sensors are used to display the temperatures of the top and bottom radial bearings on the top and bottom radial bearing virtual instruments 36, 38. The information derived from the crusher temperature sensor is used to display the temperature of the crusher chamber on the crusher temperature virtual instrument 56. The information derived from the lube cycles sensor is used to display the number of lubrication cycles performed by the lubrication system on the lube cycles virtual instrument 58. The signal from the crusher lid sensor is used to indicate whether the crusher lid is open or closed on the crusher lid virtual instrument 60. Lastly, the signal from the V-belt guard sensor is used to indicate whether the guard is open or closed on the V-belt guard virtual instrument 62.

The above-described virtual instrument display information is in each case a direct function of the measurements made by one or more associated sensors. Under the control of graphical development software on the computer, each of the sensor signals can be used alone or in combination with information from other sensors to yield valuable information regarding conditions of the crusher as discussed below in greater detail.

Figure 5:
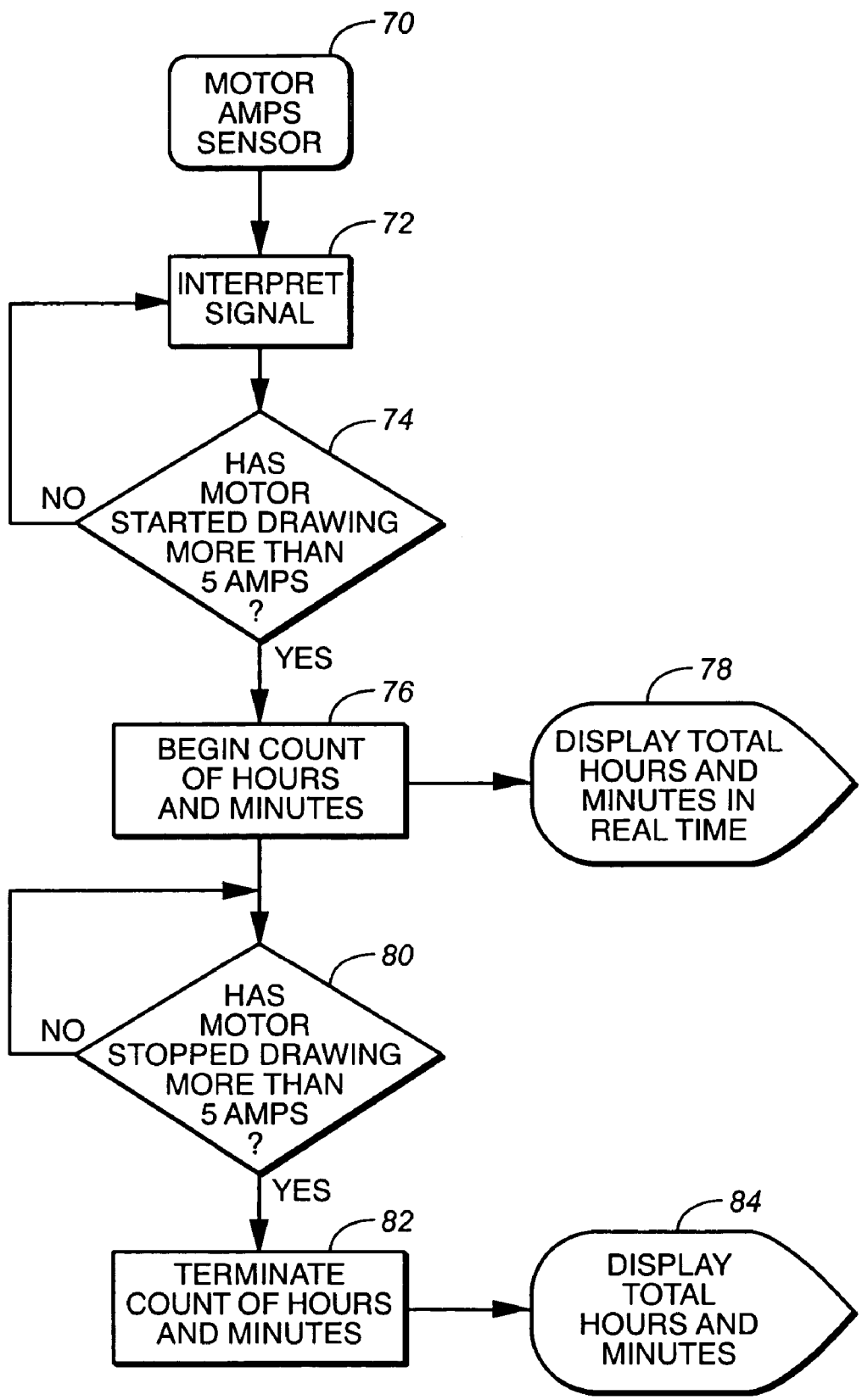
FIG. 5 is a schematic diagram showing the process for monitoring the run down time of the rotor of a VSI crusher according to the invention.

With reference now to FIG. 5, in the preferred embodiment, the elapsed hours of operation of the motor reading is derived by monitoring the motor amps sensor, at 70, interpreting the motor amps sensor signal, at 72, and querying whether the motor has commenced drawing in excess of five amps of current, at 74, indicating that the motor has started running. If the motor has not commenced drawing more than five amps, the process returns to the signal interpretation step 72. If the motor has commenced drawing more than five amps, a command is executed to begin counting hours and minutes, at 76. The running count of hours and minutes is displayed on the elapsed hours virtual instrument 64 (see FIG. 2), at 78. A second query is then executed asking if the motor has ceased drawing more than five amps, at 80. If the motor has not ceased drawing more than five amps, the process returns to the beginning of the query. If, though, the motor has stopped drawing more than five amps, indicating that the motor has stopped running, an instruction is executed to terminate counting hours and minutes, at 82. The total accumulated count of hours and minutes is then displayed on the elapsed hours virtual instrument 64, at 84, providing an effective measure of the operational age of the machine.

Figure 6:
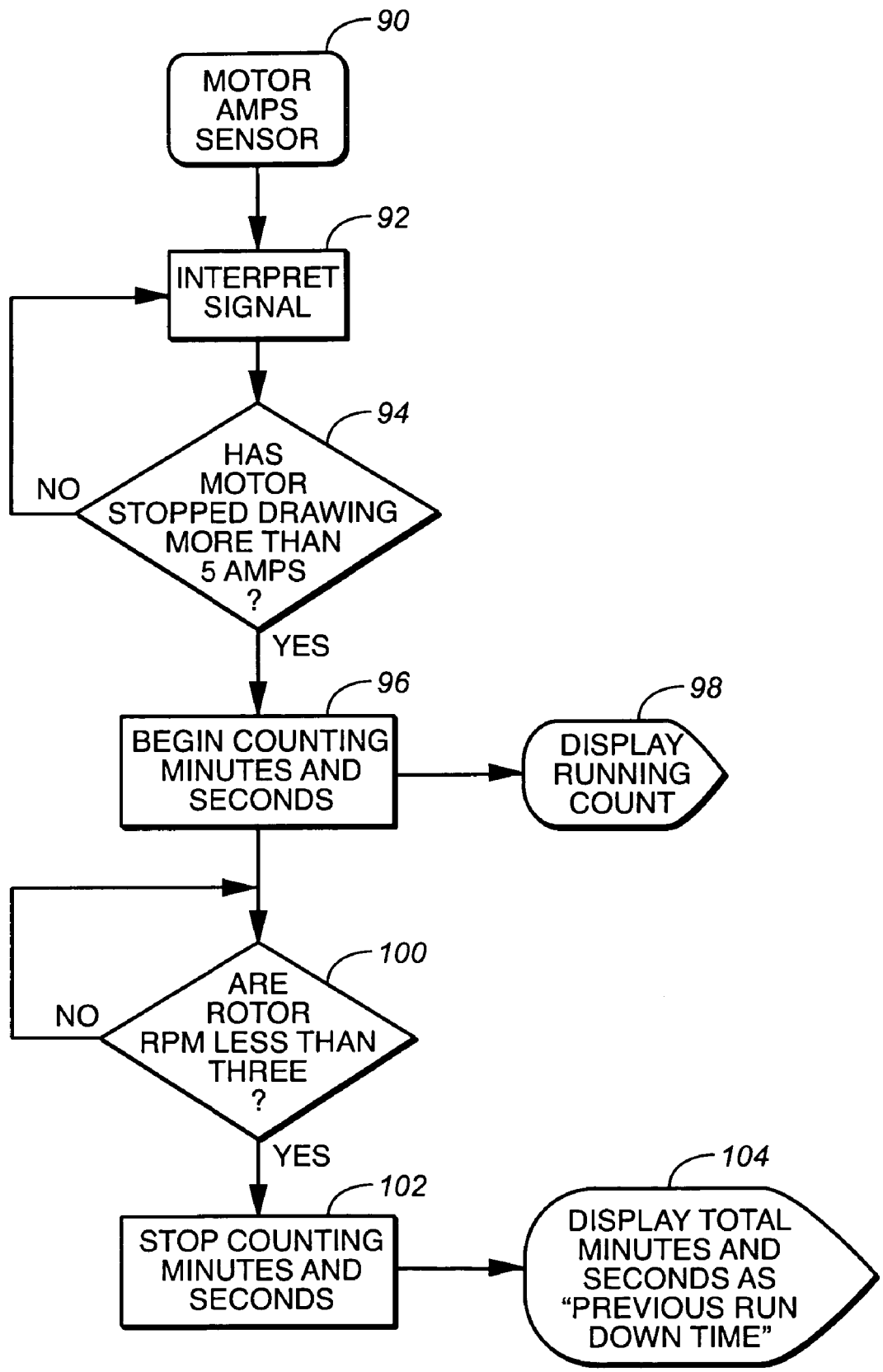
FIG. 6 is a schematic diagram showing the process for monitoring the elapsed hours of operation of the motor of a VSI crusher according to the invention.

Rundown time is the time it takes for the rotor to come to a full rotational stop after power to the rotor has been shut off. Rundown time is a potentially critical piece of information, because a significant decrease in the amount of time it takes for the rotor to cease turning is a reliable indication of problems in one or both radial bearings, the rotor, or surrounding structures. For example, if the rundown time were significantly decreased, and it was noticed that the top radial bearing temperature was significantly higher, these readings would be a likely indication of a problem in the top radial bearing. Referring now to FIG. 6, in the preferred embodiment of the invention rundown time is derived by monitoring the motor amps sensor, at 90, interpreting the signal at repeating intervals, at 92, and querying whether the motor has stopped drawing amps of more than five, at 94. If the motor has not stopped drawing more than 5 amps, the process returns to the signal interpretation step, at 92. If the motor has stopped drawing more than 5 amps, indicating that the motor is off and the rotor has begun to slow its rotation, an instruction is executed to begin counting minutes and seconds at 96. While the rundown time count is performed, the rundown time virtual instrument 66 (see FIG. 2A) displays the rundown time at 98. In the next step, at 100, a query asks if the rotor RPM sensor senses that the speed of the rotor has dropped below 3 RPM, indicating that the rotor has effectively stopped moving. If the RPMs are not less than 3, the process returns to the query again. If the RPMs measure less than 3, a command is executed to terminate the minute and second counter, at 102. The rundown time measured is then written to the previous rundown time virtual instrument 68 (see FIG. 2A) at step 104, providing a record of the most recent rundown time. A data log (not illustrated) is maintained of all the run down times experienced by the machine, the logged times of which can be consulted for a ready comparison with the Previous Run Down Time. Obviously, if the latest rundown time is significantly slower than the preceding logged rundown times, the rotor or radial bearings are likely to be experiencing a problem. It will be appreciated by those of skill in the art that the amperage draw minimum measured by the motor amps sensor which is used to trigger the minutes and seconds counter could be a number other than five, but the choice should be a number that reliably indicates the motor has stopped running. Similarly, the RPM benchmark used to indicate that the rotor has stopped moving could be a number other than three, but it would be preferable to use a number that fairly indicates the rotor has effectively stopped rotating.

In the preferred embodiment, the information derived from the temperature and vibration sensors in most cases will trigger an alarm if a condition exceeds a select alarm limit. With reference again to FIG. 4, after the signal is interpreted, at 32, a query is executed asking if the value of the sensor signal is above an established alarm level, at 110. The alarm level for each sensor will be set at a value appropriate for the condition being measured. If the value is not above the alarm level, the process returns to the signal interpretation step 32. If the value exceeds the alarm level, a command is executed instructing the virtual instrument for the condition to turn color, preferably a bright color, such as red, at 112. In the preferred embodiment, the virtual instrument may display in a first color, such as green, to indicate that the valve being measured is operating within safe parameters, and it may display in a second color contrasting with the first, such as red, when the valve has fallen outside of the safe parameters, indicating an alarm condition. Additionally, according to the preferred embodiment, an audible alarm is activated, at 114. The process shown in FIG. 4 continues with a further query that asks if the alarm level has persisted for at least ten seconds, at 116. If it has not, the process returns to the signal interpretation step 32. If, however, the alarm level has persisted for at least ten seconds, a command is executed, at 118, to open a shutdown relay 24 (see FIG. 1) in the input/output unit which shuts down the machine, at 120. It is within the contemplation of this invention that a time different than ten seconds may be selected for the alarm level to persist before opening the shutdown relay.

In the preferred embodiment, each of the following conditions has an established upper limit, which, when exceeded, triggers visual and audible alarms: crusher vibration, top radial bearing temperature, bottom radial bearing temperature, top motor bearing temperature, bottom motor bearing temperature, motor phase 1 temperature, motor phase 2 temperature, and motor phase 3 temperature. In a particularly preferred embodiment, when the alarm for the crusher lid of V-belt guard is triggered, indicating that the lid or guard is open, the virtual instrument icon will, in addition to turning red, change to depict the crusher lid separated from the crusher body or the V-belt guard in an open state. It will be readily appreciated by those of skill in the art that the alarm process for each condition could be configured to send a signal to the shutdown relay at a particular time, not necessarily identical to the other alarms. Optionally, in another embodiment of the invention, the crusher temperature may trigger audio-visual alarms.

Figure 3A:
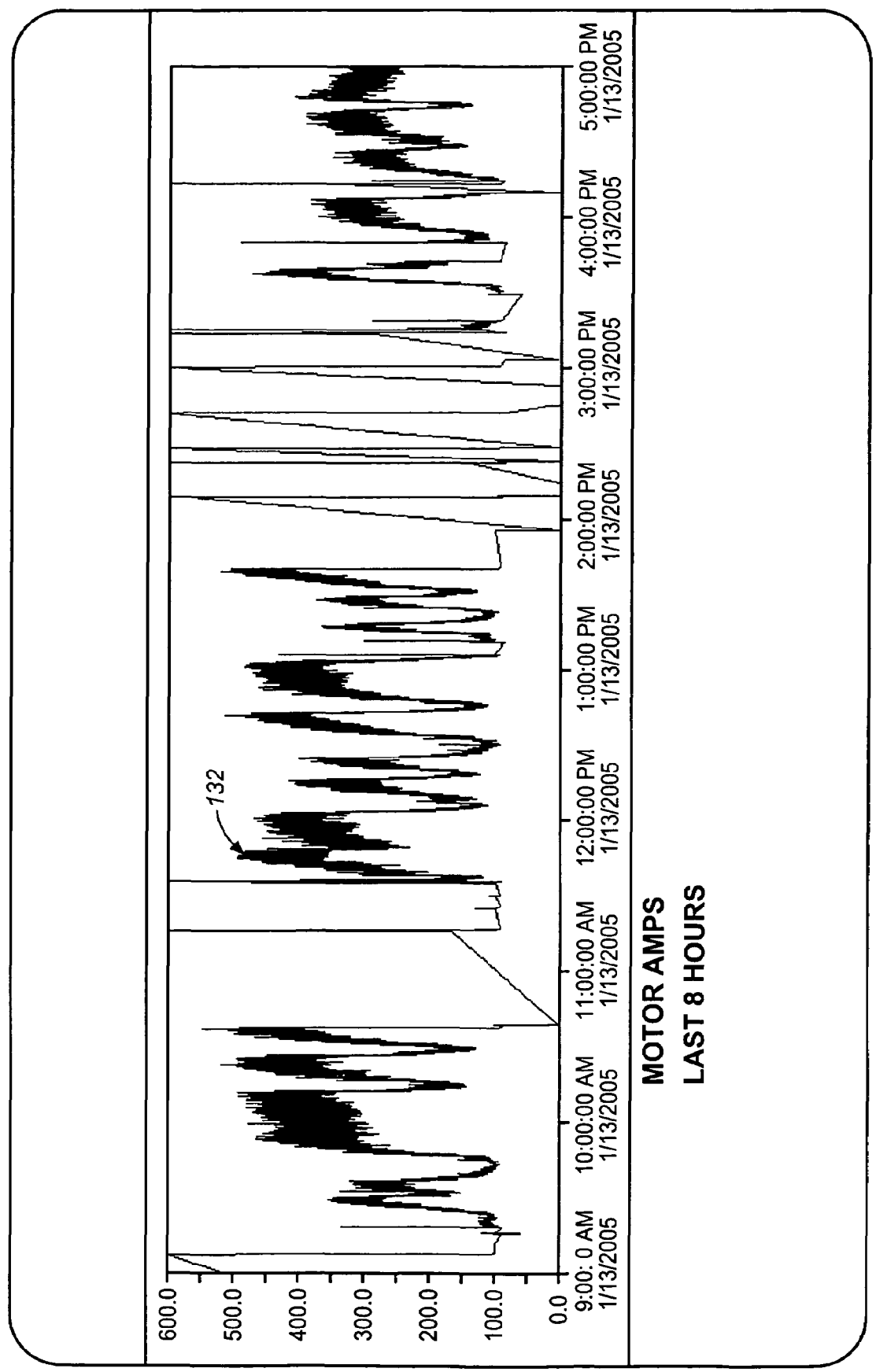
FIGS. 3A, 3B and 3C are exemplary representations of historical data viewers depicting historical information regarding the status of motor amps, bearing temperature, and crusher vibration, respectively.
Figure 3B:
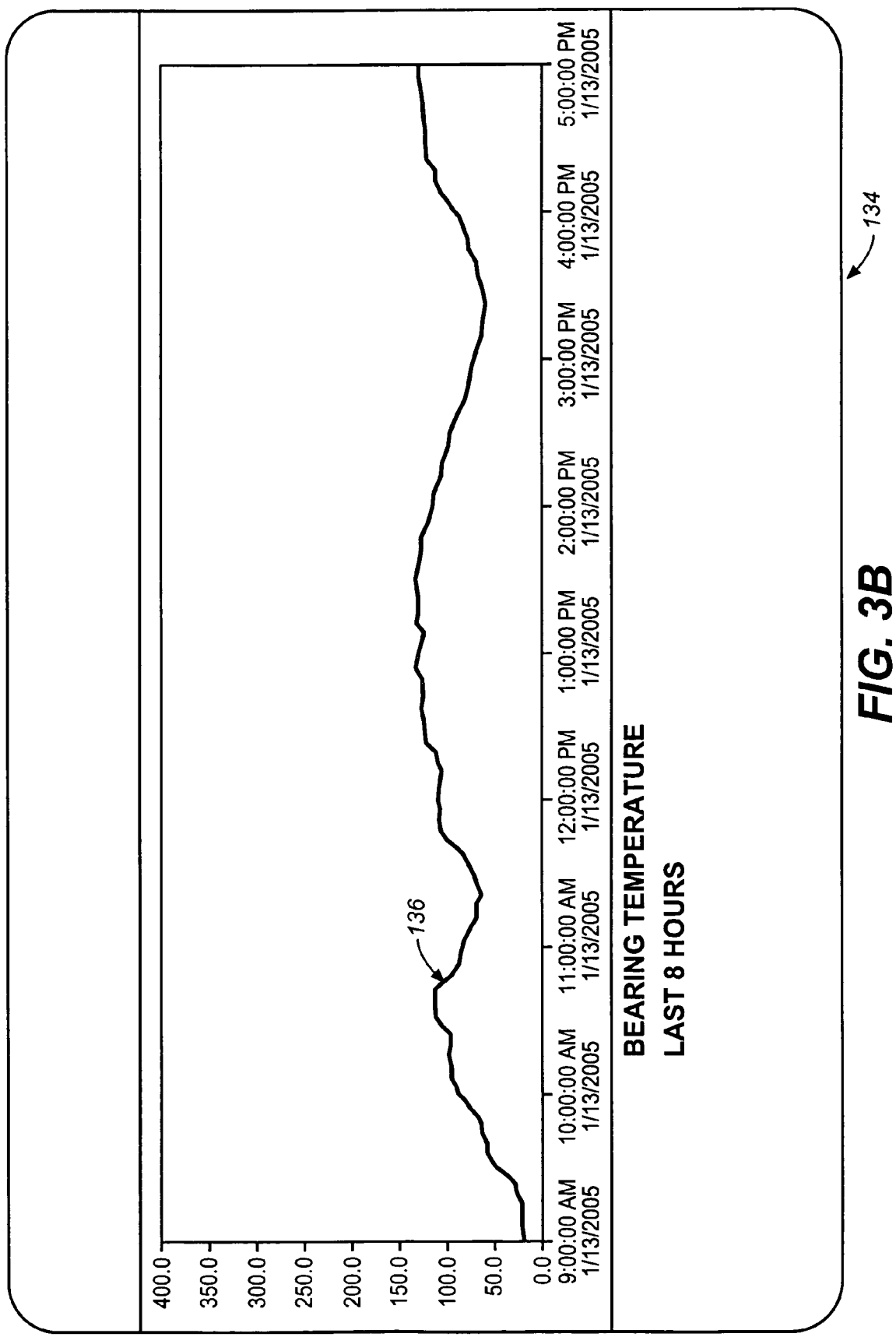
Figure 3C:
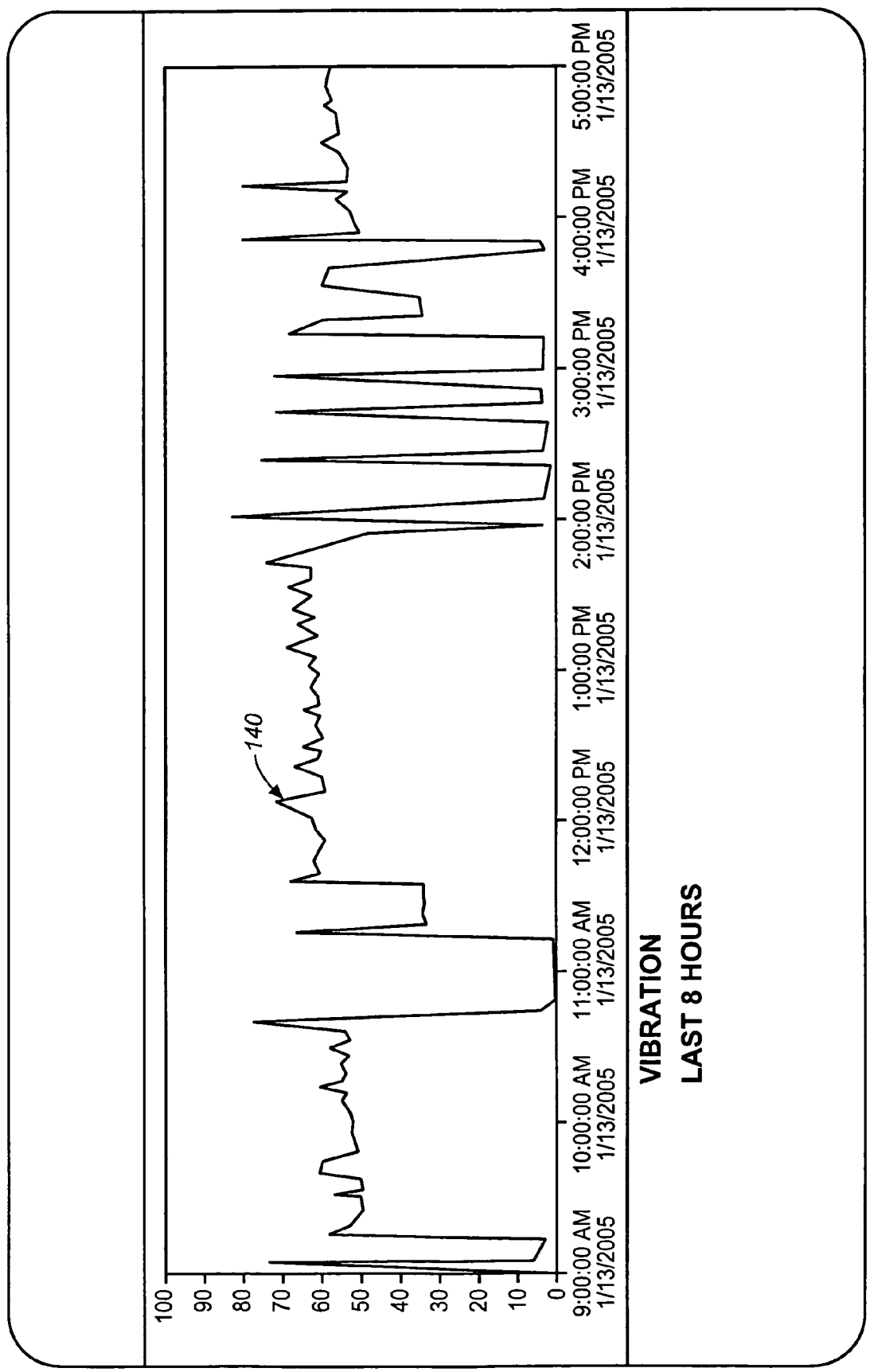

In addition to making it possible to monitor numerous conditions of the crusher on a single integrated display (see FIG. 2), the invention records data regarding each condition discussed above in a memory such that a historical log of the status of any of the conditions for a selected time period may be viewed in a historical data viewer virtual instrument. Thus, FIG. 3A depicts a motor amps historical data viewer 130 showing a historical record 132 of the status of the motor amperage draw over the immediately preceding eight hours of operation. Similarly, FIG. 3B depicts an exemplary bearing temperature historical data viewer 134 showing a historical record 136 of the temperature of one of the radial bearings, and FIG. 3C illustrates a crusher vibration historical data viewer 138 showing a historical record 140 of the vibration of the crusher, over the most recent eight hour period of operation. Although the default view of the historical record shows the most recent eight hour operational period, any time period may be selected over the operational history of the crusher for viewing in any one of the conditions experienced by the crusher in the historical data viewers.

Applicants have determined that LabVIEW Graphical Development software, available from National Instruments Corporation, is suitable for creation of the software instructions needed to implement the invention.

As discussed above, a monitoring system according to the invention allows monitoring of the conditions of a VSI crusher from a computer in communication with sensors attached directly to the crusher device. Although in the preferred embodiment, the sensors are hardwired directly to the input/output device which is, in turn, hardwired through an Ethernet cable to the computer, it is within contemplation of the invention that the sensors could be in wireless communication with the input/output device or directly with the computer. Similarly, the input/output device could be in wireless communication with the computer. In a further aspect of the invention, another computer acting as a remote monitoring station 28 may monitor and control the crusher by establishing communication with the local computer, which is in direct communication with the crusher via a computer network 26. Accordingly, a remote monitoring station can establish communications through the internet with a computer located at the site of a crusher for purposes of controlling and monitoring the crusher. This is a tremendous advantage, in that it allows the manufacturer of a VSI crusher to assess in real time the conditions of monitored crushers located anywhere in the world. By sensing, reporting and recording the conditions of the crusher at critical points throughout the device, the system enables a forensic examination of a VSI crusher with high accuracy and enables preventative action to be taken before the occurrence or exacerbation of a serious problem.

There have thus been described certain preferred embodiments of a monitoring system for a Vertical Shaft Impact crusher. It should be understood by those of skill in the art that the monitoring system described above and recited in the claims below is intended to apply to the fullest extent possible to all types of rock crushers and should not be limited to only vertical shaft impact rock crushers. While preferred embodiments have been described and disclosed, it will be recognized by those with skill in the art that modifications are within the true spirit and scope of the invention. The appended claims are intended to cover all such modifications.

We claim:

1. A system for monitoring a rock crusher of the type having a rotor mounted on a bearing cartridge assembly having top and bottom radial bearings, the monitoring system comprising:
   a plurality of sensors for continuously monitoring the current status of a plurality of crusher components, said plurality of sensors including at least one radial bearing temperature sensor to measure the temperature of one of the top and bottom radial bearings,
   a computer in communication with said plurality of sensors, and
   a graphical user interface in communication with said computer, said graphical user interface for displaying a plurality of virtual instruments, said plurality of virtual instruments including at least one radial bearing temperature virtual instrument to display the current temperature of one of the top and bottom radial bearings
   said computer for interpreting signals received from said plurality of sensors to render a perceptible indication of each of a plurality of crusher conditions on one of said plurality of virtual instruments, each of said plurality of crusher conditions associated with at least one of said plurality of sensors.

2. The monitoring system of claim 1 wherein:
   said at least one radial bearing temperature sensor includes a top radial bearing temperature sensor and a bottom radial bearing temperature sensor, and
   said at least one radial bearing temperature virtual instrument includes a top radial bearing temperature virtual instrument and a bottom radial bearing temperature virtual instrument.

3. The monitoring system of claim 1 further comprising:
   a top radial bearing sensor for measuring the temperature of the top radial bearing,
   said computer having a memory for recording the temperature of the top radial bearing, and
   said plurality of virtual instruments includes a top radial bearing temperature historical data viewer for displaying the recorded history of the temperature of the top radial bearing over said selected time period.

4. The monitoring system of claim 1 further comprising:
   a bottom radial bearing sensor for measuring the temperature of the bottom radial bearing,
   said computer having a memory for recording the temperature of the bottom radial bearing, and
   said plurality of virtual instruments includes a bottom radial bearing temperature historical data viewer for displaying the recorded history of the temperature of the bottom radial bearing over said selected time period.

5. A system for monitoring a rock crusher comprising:
   a plurality of sensors for continuously monitoring the current status of a plurality of crusher components,
   a computer in communication with said plurality of sensors, and
   a graphical user interface in communication with said computer, said graphical user interface for displaying a plurality of virtual instruments, said plurality of virtual instruments including a run down time virtual instrument for displaying the run down time of the rotor,
   said computer for interpreting signals received from said plurality of sensors to render a perceptible indication of each of a plurality of crusher conditions on one of said plurality of virtual instruments, each of said plurality of crusher conditions associated with at least one of said plurality of sensors.

6. A system for monitoring a rock crusher of the type having a rotor and a motor for driving the rotor, the monitoring system comprising:
   a plurality of sensors for continuously monitoring the current status of a plurality of crusher components,
   a computer in communication with said plurality of sensors, and
   a graphical user interface in communication with said computer, said graphical user interface for displaying a plurality of virtual instruments, said plurality of virtual instruments including a run down time virtual instrument for displaying the run down time of the rotor,
   said computer for interpreting signals received from said plurality of sensors to render a perceptible indication of each of a plurality of crusher conditions on one of said plurality of virtual instruments, each of said plurality of crusher conditions associated with at least one of said plurality of sensors,
   said plurality of sensors including a motor amps sensor for measuring the amperage draw of the motor, said computer for monitoring a signal received from said motor amps sensor and, when said signal indicates that the motor amperage has fallen below a selected level, commencing a run down time count and displaying said run down time count on said run down time instrument,
   said plurality of sensors also including a rotor RPM sensor for measuring the RPMs of the rotor, said computer further for monitoring a signal received from said RPM sensor and, when said signal indicates that the RPMs of the rotor have fallen below a selected level, terminating said run down time count and displaying the total elapsed time of said run down time count as the most recent run down time of the rotor on said run down time virtual instrument.

7. The monitoring system of claim 6 further comprising:
said plurality of virtual instruments including a previous run down time instrument for displaying the most recent run down time.

8. A system for monitoring a rock crusher of the type having a motor, the monitoring system further comprising:
a plurality of sensors for continuously monitoring the current status of a plurality of crusher components,
a computer in communication with said plurality of sensors, and
a graphical user interface in communication with said computer, said graphical user interface for displaying a plurality of virtual instruments, said plurality of virtual instruments including an elapsed hours instrument for displaying the total elapsed hours of operation of the motor,
said computer for interpreting signals received from said plurality of sensors to render a perceptible indication of each of a plurality of crusher conditions on one of said plurality of virtual instruments, each of said plurality of crusher conditions associated with at least one of said plurality of sensors.

9. A system for monitoring a rock crusher of the type having a motor, the system comprising:
a plurality of sensors for continuously monitoring the current status of a plurality of crusher components, said plurality of sensors including a motor amps sensor for measuring the amperage draw of the motor,
a computer in communication with said plurality of sensors, said computer for interpreting signals received from said plurality of sensors to render a perceptible indication of each of a plurality of crusher conditions on one of said plurality of virtual instruments, each of said plurality of crusher conditions associated with at least one of said plurality of sensors, said computer also for monitoring a signal received from said motor amps sensor and, when said signal indicates that the motor amperage has exceeded a selected level, commencing an elapsed hours time count, and when said signal indicates that the motor amperage has fallen below said selected level, terminating said elapsed hours time count, and
a graphical user interface in communication with said computer, said graphical user interface for displaying a plurality of virtual instruments, said plurality of virtual instruments including an elapsed hours instrument for displaying the total elapsed hours of operation of the motor,
and said computer for displaying on said elapsed hours instrument the total elapsed hours counted.

10. A system for monitoring a rock crusher, the crusher of the type having a rotor and a motor for driving the rotor, the monitoring system comprising:
a plurality of sensors for continuously monitoring the status of a plurality of crusher components, said plurality of sensors including a motor amps sensor for measuring the amperage draw of the motor and a rotor RPM sensor for measuring the revolutions per minute of the rotor,
a computer in communication with said plurality of sensors,
a graphical user interface in communication with said computer, said graphical user interface for displaying a plurality of virtual instruments, said plurality of virtual instruments including a run down time instrument for displaying the run down time of the rotor,
said computer for interpreting signals received from said plurality of sensors to render a perceptible indication of each of a plurality of crusher conditions on one of said plurality of virtual instruments, each of said plurality of crusher conditions associated with at least one of said plurality of sensors, said computer in addition for monitoring a signal received from said motor amps sensor and, when said signal indicates that the amperage draw of the motor has fallen below a selected level, commencing a run down time count and displaying said run down time count on said run down time instrument, and said computer for monitoring a signal received from said RPM sensor and, when said signal indicates that the revolutions per minute of the rotor have fallen below a selected level, terminating said run down time count and displaying the total elapsed time of said run down time count as the most recent run down time of the rotor on said run down time instrument.

11. A method for monitoring a rock crusher of the type having a rotor and a motor for driving the rotor, the method comprising:
receiving by a computer signals indicating the current status of each of a plurality of crusher components, said computer signals including a first signal from a motor amps sensor, and a second signal from a rotor RPM sensor,
interpreting said signals to determine a plurality of crusher conditions, each of said plurality of crusher conditions associated with at least one of said plurality of crusher components, said interpreting said signals including interpreting said first signal to determine the amperage draw of the motor, and interpreting said second signal to determine the RPMs of the rotor,
commencing a run down time count when the amperage draw falls below a selected level,
terminating said run down count when the RPMs falls below a selected level,
displaying a perceptible indication of each of said plurality of crusher conditions on one of a plurality of virtual instruments on a graphical user interface, said displaying including displaying said run down time count on a run down time virtual instrument, and displaying the total elapsed time measured by said run down time count on said run down time virtual instrument.

12. A method for monitoring a rock crusher of the type having a motor, the method comprising:
receiving by a computer signals indicating the current status of each of a plurality of crusher components, said signals including a signal from a motor amps sensor,
interpreting said signals to determine a plurality of crusher conditions, each of said plurality of crusher conditions associated with at least one of said plurality of crusher components, said interpreting said signals including interpreting said signal from said motor amps sensor to determine the amperage draw of the motor,
commencing an elapsed hours time count when the amperage exceeds a selected level,
terminating said elapsed hours time count when the amperage falls below said selected level, and
displaying a perceptible indication of each of said plurality of crusher conditions on one of a plurality of virtual instruments on a graphical user interface, said displaying including displaying the total elapsed hours counted by said elapsed hours time count on an elapsed hours virtual instrument.

13. A system for monitoring a rock crusher of the type having a crusher lid, the system comprising:
a plurality of sensors for continuously monitoring the current status of a plurality of crusher components, said plurality of sensors including a crusher lid sensor for sensing whether the crusher lid is open or closed, a computer in communication with said plurality of sensors, and a graphical user interface in communication with said computer, said graphical user interface for displaying a plurality of virtual instruments, said plurality of virtual instruments including a crusher lid virtual instrument for displaying the current status of the crusher lid as being open or closed, said crusher lid virtual instrument comprising an icon having a safe mode and an alarm mode, in said safe mode said icon depicting an exemplary crusher in a first color, and in said alarm mode said icon depicting said exemplary crusher in a contrasting color to said first color, said exemplary crusher having a crusher body and a lid separated from said crusher body, said computer for interpreting signals received from said plurality of sensors to render a perceptible indication of each of a plurality of crusher conditions on one of said plurality of virtual instruments, each of said plurality of crusher conditions associated with at least one of said plurality of sensors.

14. The monitoring system of claim 13 wherein:
said first color is green and said contrasting color is red.

15. A system for monitoring a rock crusher of the type having a V-belt guard, the system comprising:

a plurality of sensors for continuously monitoring the current status of a plurality of crusher components, said plurality of sensors including a V-belt guard sensor for sensing whether the V-belt guard is open or closed, a computer in communication with said plurality of sensors, and a graphical user interface in communication with said computer, said graphical user interface for displaying a plurality of virtual instruments, said plurality of virtual instruments including a V-belt guard virtual instrument for displaying the current status of the V-belt guard as being open or closed, said V-belt guard virtual instrument comprising an icon having a safe mode and an alarm mode, in said safe mode said icon depicting an exemplary crusher in a first color, and in said alarm mode said icon depicting said exemplary crusher in a contrasting color to said first color, said exemplary crusher having a V-belt guard shown in an open state, said computer for interpreting signals received from said plurality of sensors to render a perceptible indication of each of a plurality of crusher conditions on one of said plurality of virtual instruments, each of said plurality of crusher conditions associated with at least one of said plurality of sensors.

16. The monitoring system of claim 15 wherein:
said first color is green and said contrasting color is red.

* * * * *